United States Patent
Wu et al.

(10) Patent No.: US 9,344,895 B2
(45) Date of Patent: May 17, 2016

(54) METHOD AND SYSTEM FOR SECURELY ACCESSING PORTABLE HOTSPOT FOR INTELLIGENT MOBILE PHONES

(71) Applicant: HUIZHOU TCL MOBILE COMMUNICATION CO., LTD, Huizhou, Guangdong (CN)

(72) Inventors: Xiaoyong Wu, Guangdong (CN); Xinxing Wu, Guangdong (CN); Jinggao Zhou, Guangdong (CN); Hongmei Zhu, Guangdong (CN)

(73) Assignee: Huizhou TC Mobile Communication Co., Ltd, Huizhou (CN)

( * ) Notice: Subject to any disclaimer, the term of this patent is extended or adjusted under 35 U.S.C. 154(b) by 0 days.

(21) Appl. No.: 14/388,849

(22) PCT Filed: Jun. 14, 2013

(86) PCT No.: PCT/CN2013/077233
§ 371 (c)(1),
(2) Date: Sep. 29, 2014

(87) PCT Pub. No.: WO2014/044065
PCT Pub. Date: Mar. 27, 2014

(65) Prior Publication Data
US 2015/0065088 A1    Mar. 5, 2015

(30) Foreign Application Priority Data

Sep. 18, 2012 (CN) .......................... 2012 1 0346162

(51) Int. Cl.
*H04L 29/06* (2006.01)
*H04L 9/32* (2006.01)
(Continued)

(52) U.S. Cl.
CPC ............ *H04W 12/08* (2013.01); *H04B 5/0031* (2013.01); *H04W 4/008* (2013.01); *H04W 12/06* (2013.01);
(Continued)

(58) Field of Classification Search
CPC ....... H04L 63/0428; H04L 63/08; H04L 9/08; H04L 63/061; H04L 9/12; H04L 9/22; H04W 12/02; H04W 12/04; H04W 12/06
USPC ............ 380/44, 255, 262, 270, 278; 713/153, 713/168, 171; 726/4
See application file for complete search history.

(56) References Cited

U.S. PATENT DOCUMENTS

| | | | |
|---|---|---|---|
| 2008/0044024 A1* | 2/2008 | Oh ........................ | H04L 63/062 380/270 |
| 2010/0246818 A1 | 9/2010 | Yao | |
| 2013/0039352 A1* | 2/2013 | Ruster ................... | H04W 88/08 370/338 |

FOREIGN PATENT DOCUMENTS

| | | |
|---|---|---|
| CN | 101123811 A | 2/2008 |
| CN | 102315864 A | 1/2012 |

(Continued)

*Primary Examiner* — Aravind Moorthy
(74) *Attorney, Agent, or Firm* — Ladas & Parry LLP

(57) ABSTRACT

A method and a system for securely accessing a portable hotspot for intelligent mobile phones, comprises an intelligent mobile phone used as an AP and another intelligent mobile phone used as an STA. The AP comprises an AP NFC module and a first data transmission module; and the STA comprises an STA NFC module and a second data transmission module. The AP uses the NFC module to perform a WPA security authentication with the STA, and uses the first data transmission module to perform data encrypted transmission with the second data transmission module. In the method and the system of the present disclosure, the common WLAN authentication mechanism is not adopted, and the security authentication process between the AP and the STA is completed in the NFC manner instead.

8 Claims, 4 Drawing Sheets

(51) Int. Cl.
  *G06F 7/04* (2006.01)
  *H04K 1/00* (2006.01)
  *H04L 9/00* (2006.01)
  *H04L 9/08* (2006.01)
  *H04W 12/08* (2009.01)
  *H04W 12/06* (2009.01)
  *H04W 84/12* (2009.01)
  *H04W 4/00* (2009.01)
  *H04B 5/00* (2006.01)
  *H04L 9/12* (2006.01)
  *H04W 12/02* (2009.01)
  *H04L 9/22* (2006.01)
  *H04W 12/04* (2009.01)

(52) U.S. Cl.
  CPC ............... *H04W 84/12* (2013.01); *H04L 9/08* (2013.01); *H04L 9/12* (2013.01); *H04L 9/22* (2013.01); *H04L 63/0428* (2013.01); *H04L 63/061* (2013.01); *H04L 63/08* (2013.01); *H04L 63/18* (2013.01); *H04W 12/02* (2013.01); *H04W 12/04* (2013.01)

(56) References Cited

FOREIGN PATENT DOCUMENTS

CN  102547695 A  7/2012
CN  102843687 A  12/2012

* cited by examiner

METHOD AND SYSTEM FOR SECURELY ACCESSING PORTABLE HOTSPOT FOR INTELLIGENT MOBILE PHONES

RELATED APPLICATION

This application is a national phase entry under 35 USC 371 of International Patent Application No. PCT/CN2013/077233 filed on 14 Jun. 2013, which was published on 27 Mar. 2014 with International Publication Number WO 2014/044065 A1, which claims priority from Chinese Patent Application No. 201210346162.1 filed on 18 Sep. 2012, the disclosures of which are incorporated in their entirety by reference herein.

FIELD OF THE INVENTION

The present disclosure relates to the technical field of mobile communication terminals, and more particularly, to a method and a system for securely accessing a portable hotspot for intelligent mobile phones.

BACKGROUND OF THE INVENTION

With the development of the mobile internet, nowadays various kinds of mobile communication apparatuses are able to be connected to hot-spot access points (AP) through WIFI (Wireless-Fidelity) to access the internet. As one of a variety of AP hotspots, the AP in intelligent mobile phones can also provide a WIFI accessing function for the various mobile communication apparatuses at any time and anywhere. Because of the openness of WIFI, the communication security of accessing an AP via WIFI to access the internet has become a focus of concern for internet security.

Currently, in WIFI hot-spot apparatuses, security protocols that support wireless local area network (WLAN) transmission, i.e., mechanisms of security authentication between an AP and a station (STA), include WEP (Wired Equivalent Privacy) and WPA (Wi-Fi Protected Access)/WPA2 encryption mechanisms. However, the security level of WEP is not high because signals can be intercepted by a third party and the password can be easily cracked. Currently, most of WIFI hot-spot apparatuses adopt the WPA/WPA2 encryption mechanism for connection, which provides a security level much higher than the WEP encryption mechanism. However, the WPA/WPA2 encryption mechanism still presents some potential security hazards, and is likely to be cracked. Firstly in the WPA security mechanism, data transmission encryption algorithms and data integrity check algorithms including 802.1x, EAP (Extensible Authentication Protocol), TKIP (Temporal Key Integrity Protocol) and MIC (Message Integrity Code) are adopted in WPA for enterprise-level applications. 802.1x and EAP are enterprise-level authentication solutions which provide a high security level and require use of an authentication server. For home-level applications which require a lower security level and does not require use of a server, the PSK (Pre-shared Key) authentication is adopted, which is accomplished by means of encryption algorithms including PSK (Pre-shared Key), TKIP and MIC. In the WPA2 security mechanism, data transmission encryption algorithms and data integrity check algorithms including 802.1x, EAP, AES (Advanced Encryption Standard) and CCMP (Counter CBC-MAC Protocol) are adopted for enterprise-level applications, and data transmission encryption algorithms and data integrity check algorithms including PSK, AES and CCMP are adopted for home-level applications. Surely, WPA has made great improvement over WEP in terms of data encryption transmission and integrity check. However, for the home-level encryption mechanism based on PSK, processes including authentication, encrypted data transmission and data integrity check all rely on the PSK. In case of a "–0 Deautenticate" disconnection attack (i.e., a –0 Deautenticate illegal command is transmitted by a third-party attacker to the AP, to force disconnection of the AP from all STAs, and then re-authentication must be performed between the STAs and the AP for re-connection), re-connection and re-authentication must be done by the AP and the STA. During the process of re-connection and re-authentication, the attacker can intercept enough handshake packets to analyze and crack the password. FIG. 1 shows a process flow of a four-handshake authentication process adopting the prior WPA encryption mechanism, in which the steps are executed from the top to the bottom and from the left to the right:

(1) WPA-PSK Initialization (not Shown)

PSK is obtained through the pdkdf2_SHA1 algorithm according to the password, an SSID (Service Set Identifier), a length of the SSID len(SSID) and 4096. In WPA-PSK, the PSK is equal to the PMK, the password is pre-shared by the AP and the STA, and the operation function of pdkdf2_SHA1 is as follows:

$$PSK=PMK=pdkdf2\_SHA1\ (\\ Password\\ SSID,\\ Len(SSID),\\ 4096)$$

(2) The First Handshake (Step S10′)

The AP broadcasts the SSID and transmits the MAC address AP_MAC(AA) of the AP to the STA, and the PSK is generated by the STA also according to the pdkdf2_SHA1 algorithm.

(3) The Second Handshake (Step S20′)

The STA transmits a random number SNonce and transmits the MAC address STA_MAC(SA) of the STA to the AP.

After receiving the data from the STA, the AP generates an ANonce, which is used to calculate an MIC KEY (i.e., a key for message integrity check) through the SHA1_PRF algorithm. The operation function of SHA1_PRF is as follows:

$$PTK=SHA1\_PRF\ (\\ PMK,\\ Len(PMK),\\ \text{"Pairwise key expansion"},\\ Min(AA,SA)\ ||Max(AA,SA)||Min(ANonce,SNonce)||Max(ANonce,SNonce)\\ )$$

where, the PTK is a Pairwise Transient Key and is calculated through the SHA1_PRF algorithm, and the MIC KEY is formed of the first 16 bytes of the PTK.

(4) The Third Handshake (Step S30′)

The AP transmits the ANonce to the STA.

The STA generates the PTK according to SHA1_PRF to obtain the MIC KEY, and then the MIC is calculated by the STA through the HMAC_MD5 algorithm according to the MIC KEY and the 802.1x data. The operation function thereof is as follows:

```
MIC=HMAC_MD5(
              MIC KEY,
              16,
              802.1x data
              )
``` where, the 802.1x data represents one 802.1x data frame.

(5) The Fourth Handshake (Step S40')

The STA transmits 802.1x data+MIC+0000(H) to the AP.

The AP removes the MIC, puts in the MIC portion of the data frame with 0, and generates an MIC' according to the HMAC_MD5 algorithm. If MIC=MIC', then the handshake is successful; and otherwise, it means that the two passwords are inconsistent with each other or the middle of the data has been tampered, and the handshake fails.

For the WPA encryption mechanism, the security thereof relies on the pre-shared password, and currently, an effective form of attack against the WPA is the conventional dictionary attack. The KEY used in the data transmission encryption is derived from the PTK, and as can be known from the aforesaid handshake process, the privacy of the PTK is guaranteed by the password. If the communication process between the AP and the STA suffers from the "–0 Deautenticate" disconnection attack, re-connection and re-authentication must be performed between the AP and the STA. If the attacker has intercepted an enough number of handshake authentication packets which comprise information related to the password, he or she can try a dictionary attack (i.e., an exhaustive attack, which tries with all possible values of the password) by using other intercepted data together to crack the password. In this way, the WPA can be cracked.

Accordingly, improvement and advancement still have to be made on the conventional technologies.

SUMMARY OF THE INVENTION

In view of the above shortcomings of the prior art, the present disclosure provides a method and a system for securely accessing a hot-spot for intelligent mobile phones that are based on an NFC technology to overcome the drawbacks and the shortcomings of the prior art. Thereby, security hazards of the WPA encryption mechanism are eliminated, the security authentication between an AP of an intelligent mobile phone and an STA is enhanced, and the connection between the STA and the AP becomes more secure and convenient.

To solve the above technical problems, a technical solution adopted in the present disclosure is to provide a method for securely accessing a portable hotspot for intelligent mobile phones, which comprises an intelligent mobile phone used as art AP and another intelligent mobile phone used as an STA. The method comprises following steps of: (A). disposing NFC modules in the AP and the STA respectively; (B). enabling the AP and the STA to perform WPA security authentication in an NFC manner; and the step (B) specifically comprises following steps of interacting in the NFC manner: (B1). obtaining a PSK and a PMK by the AP according to a password, an SSID, an SSID length and 4096; (B2). broadcasting the SSID, a network equipment hardware address of the AP, and a first random number be the AP to the STA; and generating a second random number as well as the PSK and the PMK, obtaining a PTK according to the PMK, the network equipment hardware address of the AP, a network equipment hardware address of the STA, the first random number and the second random number, forming an MIC KEY according to front 16 bytes of the PTK, and generating an MIC according to the MIC KEY and the 802.1x protocol data by the STA; and (B3). transmitting the second random number, the network equipment hardware address of the STA, the 802.1x protocol data and the MIC by the STA to the AP; and obtaining the PTK according to the PMK, the network equipment hardware address of the AP, the network equipment hardware address of the STA, the first random number and the second random number, forming the MIC KEY according to the front 16 bytes of the PTK, and then calculating an MIC' according to the MIC KEY and the 802.1x protocol data by the AP, if MIC=MIC', then the authentication is successful, and otherwise, the authentication fails; and (C). disposing a first data transmission module and a second data transmission module in the AP and the STA respectively so that data encrypted transmission is performed between the AP and the STA via the first data transmission module and the second data transmission module.

The WPA security authentication is a WPA-PSK security authentication.

The step (B2) specifically comprises: obtaining the PSK according to the password, the SSID, the SSID length and 4096 and obtaining the PMK according to the PSK by the STA.

To solve the above technical problems, another technical solution adopted in the present disclosure is to provide a method for securely accessing a portable hotspot for intelligent mobile phones, which comprises art intelligent mobile phone used as an AP and another intelligent mobile phone used as an STA. The method comprises following steps of: (A). disposing NFC modules in the AP and the STA respectively; and (B). enabling the AP and the STA to perform WPA security authentication in an NFC manner.

Preferably, the method further comprises following step of: (C). disposing a first data transmission module and a second data transmission module in the AP and the STA respectively so that data encrypted transmission is performed between the AP and the STA via the first data transmission module and the second data transmission module.

The WPA security authentication is a WPA-PSK security authentication.

The step (B) specifically comprises following steps of: (B1). obtaining a PSK and a PMK by the AP according to a password, an SSID, an SSID, length and 4096; (B2). broadcasting the SSID, a network equipment hardware address of the AP, and a first random number by the AP to the STA; and generating a second random number as well as the PSK and the PMK, obtaining a PTK according to the PMK, the network equipment hardware address of the AP, a network equipment hardware address of the STA, the first random number and the second random number, forming an MIC KEY according to front 16 bytes of the PTK, and generating an MIC according to the MIC KEY and the 802.1x protocol data by rte STA; and (B3). transmitting the second random number, the network equipment hardware address of the STA, the 802.1x protocol data and the MIC by the STA to the AP; and obtaining the PTK according to the PMK, the network equipment hardware address of the AP, the network equipment hardware address of the STA, the first random number and the second random number, forming the MIC KEY according to the front 16 bytes of the PTK, and then calculating an MIC' a cording to the MIC KEY and the 802.1x protocol data by the AP, if MIC=MIC', then the authentication is successful, and otherwise, the authentication fails.

The step (B2) specifically comprises: obtaining the PSK according to the password, the SSID, the SSID length and 4096 and obtaining the PMK according to the PSK by the STA.

To solve the above technical problems, another technical solution adopted in the present disclosure is to provide a system for securely accessing a portable hotspot for intelligent mobile phones, which comprises an intelligent mobile phone used as an AP and another intelligent mobile phone used as an STA. The AP comprises an AP NFC module and a first data transmission module; the STA comprises an STA NFC module and a second data transmission module; and the AP employs the AP NFC module to perform a WPA security authentication with the STA NFC module of the STA, and employs the first data transmission module to perform data encrypted transmission with the second data transmission module.

The AP NFC module comprises an AP initialization module and a first calculation module; the STA NFC module comprises an STA initialization module and a second calculation module; the AP initialization module calculates a PSK and a PMK according to a password, an SSID, an SSID length and 4096, and generates a first random number; the STA initialization module calculates the PSK and the PMK according to the password, the SSID, the SSID length and 4096, and generates a second random number; the first calculation module obtains a PTK according to the PMK, a network equipment hardware address of the AP, a network equipment hardware address of the STA, the first random number and the second random number, forms an MIC KEY according to front 16 bytes of the PTK, and then calculates an MIC' according to the MIC KEY and the 802.1x protocol data; and the second calculation module obtains a PTK according to the PMK, the network equipment hardware address of the AP, the network equipment hardware address of the STA, the first random number and the second random number, forms the MIC KEY according to the front 16 bytes of the PTK, and then calculates an MIC according to the MIC KEY and the 802.1x protocol data; the AP further comprises an authentication determining module, which is configured to determine whether the MIC' and the MIC calculated by the first calculation module and the second calculation module respectively are equal to each other.

As compared to the prior art, the method and the system for securely accessing the portable hotspot for the intelligent mobile phones of the present disclosure accomplish the security authentication process between an AP and an STA in the NFC manner instead of the common WLAN authentication mechanism. Because the communication distance of the NPC is within a short distance of 10 cm, the communication between the AP and the STA becomes more reliable and an attacker has no opportunity to acquire handshake packets; and after the authentication is completed within the short distance, communication within a longer distance can further be performed via the WPA data encrypted transmission.

DETAILED DESCRIPTION OF THE INVENTION

To make the objectives, technical solutions and advantages of the present disclosure clearer and more apparent, embodiments of the present disclosure will be detailed hereinafter with reference to the accompanying drawings. It shall be understood that, the embodiments described herein are only provided for purpose of illustration rather than to limit the present disclosure.

For convenience of description, some of the technical terms referred to hereinbelow are represented by their abbreviations, which are explained as follows:
AP: access point;
STA: station;
AP_MAC: network equipment hardware address of the access point;
STA_MAC: network equipment hardware address of the station;
AP_WPA module: first data transmission module;
STA_WPA module: second data transmission module;
802.1x data: 802.1x protocol data;
MIC KEY: message integrity check keyword;

A method for securely accessing a portable hotspot for intelligent mobile phones according to the present disclosure is achieved according to the NFC (Near Field Communication) technology. Specifically, the NFC technology is used between an intelligent mobile phone used as the AP and another intelligent mobile phone used as the STA to allow the STA to securely access the AP. In this way, a simple and touch-controlled method for accessing the hotspot of the intelligent mobile phone is provided. Furthermore, because the NFC has a two-way data transmission function, mutual authentication and dynamic encryption between the AP and the STA can be achieved. In the prior art, the attacker can perform a disconnection attack when the AP and the STA are connecting to each other, to force re-connection and re-authentication between the AP and the STA for acquiring handshake authentication packets. In view of this, the present disclosure uses the NFC communication to replace the WPA authentication process. Because of the near field communication function of NFC and the portability of the intelligent mobile phones, the authentication for the connection between the intelligent mobile phone used as the AP and the intelligent mobile phone used as the STA becomes very reliable and secure. Therefore, the problem that the attacker can acquire the handshake packets between the AP and the STA through a disconnection attack to acquire a password can be prevented.

Figure 1:
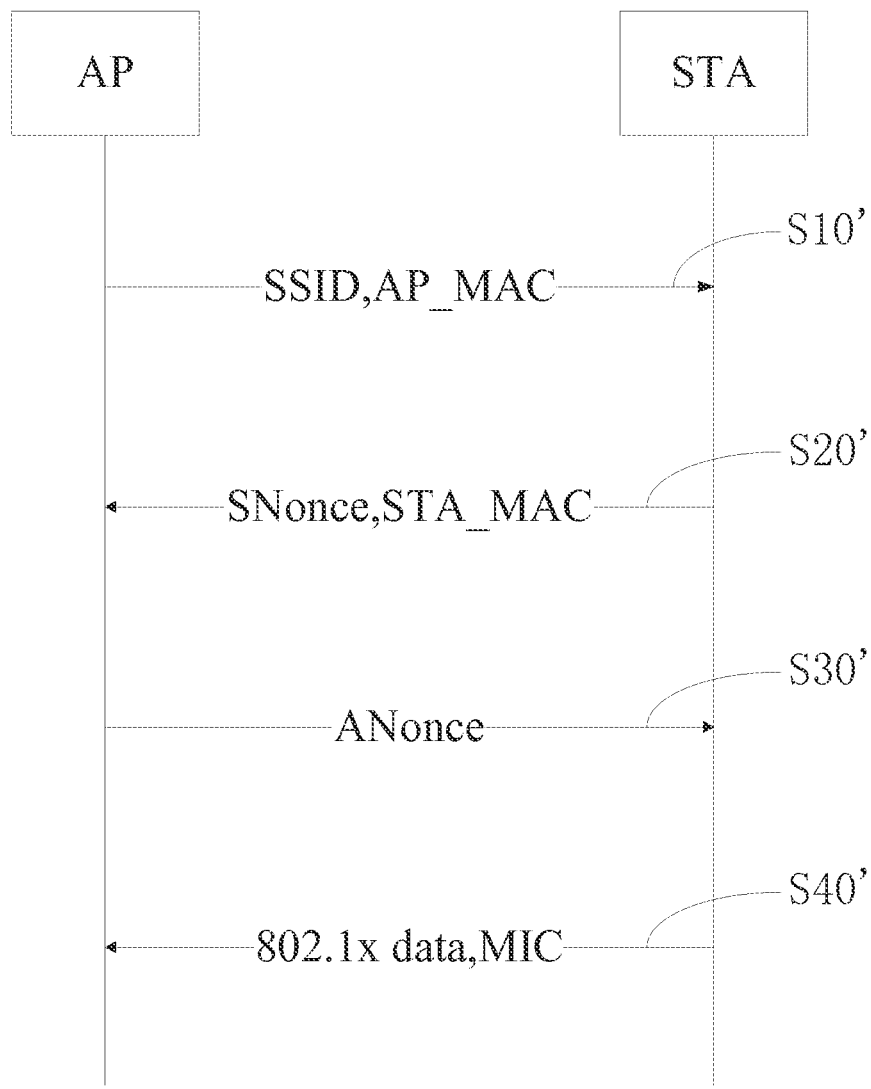
FIG. 1 is a flowchart diagram illustrating a four-handshake authentication process adopting the prior art WPA encryption mechanism.
Figure 2:
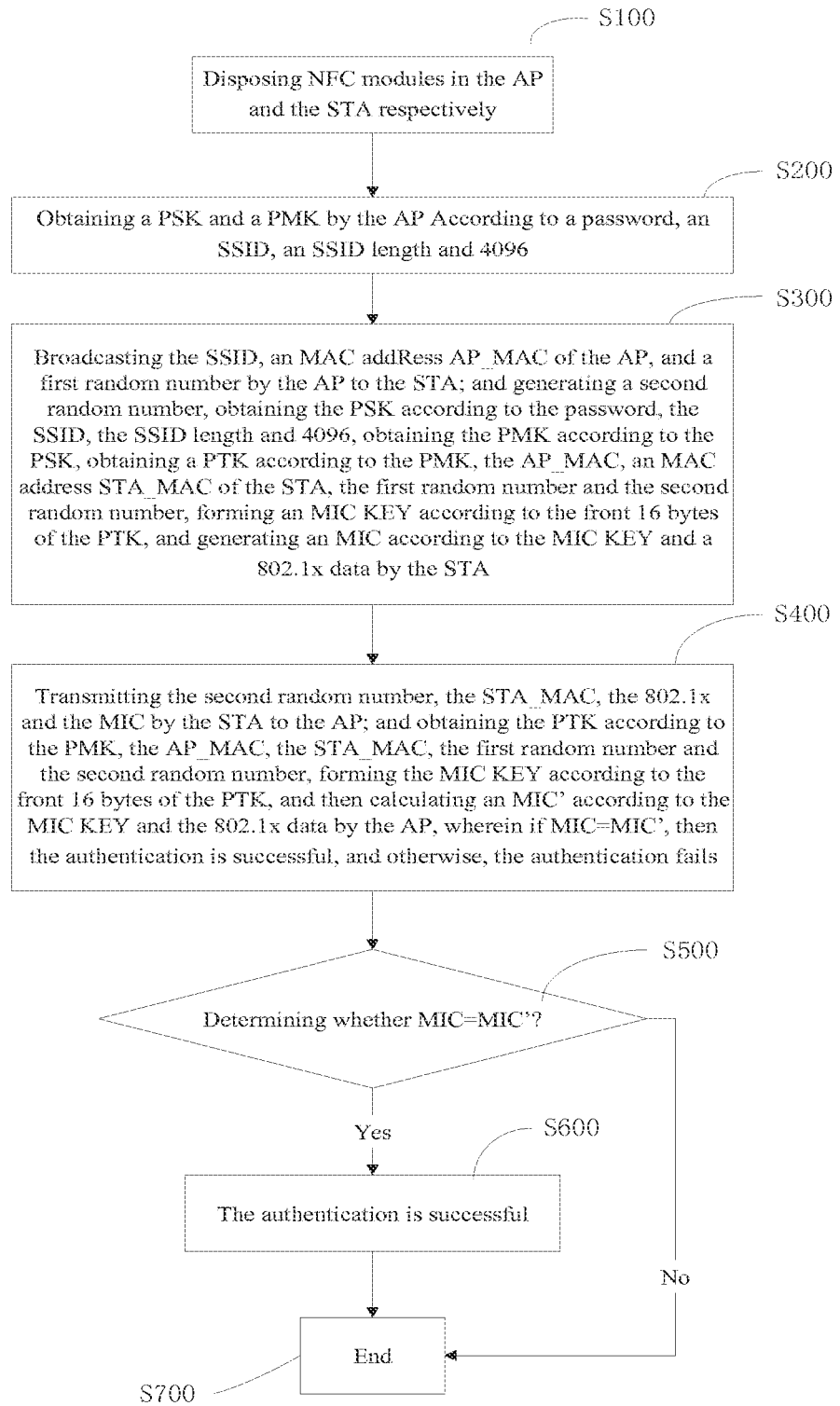
FIG. 2 is a flowchart diagram illustrating a method for securely accessing a portable hotspot for intelligent mobile phones according to the present disclosure.

FIG. 2 shows a flowchart diagram illustrating a method for securely accessing a portable hotspot for intelligent mobile phones according to the present disclosure.

S100: disposing NFC modules in an AP and an STA respectively;

S200: obtaining a PSK and a PMK by the AP according to a password, an SSID, an SSID length and 4096;

S300: broadcasting the SSID, an MAC address AP_MAC of the AP, and a first random number by the AP to the STA; and generating a second random number, obtaining the PSK according to the password, the SSID, the SSID length and 4096, obtaining the PMK according to the PSK, obtaining a PTK according to the PMK, the AP_MAC, an MAC address STA_MAC of the STA, the first random number and the second random number, forming an MIC KEY according to front 16 bytes of the PTK, and generating an MIC according to the MIC KEY and a 802.1x data by the STA;

S400: transmitting the second random number, the STA_MAC, the 802.1x and the MIC by the STA to the AP; and obtaining the PTK according to the PMK, the AP_MAC, the STA_MAC, the first random number and the second random number, forming the MIC KEY according to the front 16 bytes of the PTK, and then calculating an MIC' according to the MIC KEY and the 802.1x data by the AP;

S500: determining whether MIC=MIC'; and if MIC=MIC', a step S600 is executed, and otherwise, a step S700 is executed;

S600: the authentication is successful;

S700: end.

In the method for securely accessing the portable hotspot for the intelligent mobile phones according to the present disclosure, the AP and the STA needs to be close to each other during the authentication process between the AP and the STA that is performed through the NFC technology. Different from the prior art in which the authentication is completed through four handshakes, the authentication is completed through two handshakes in the method of the present disclosure. Hereinbelow, the two-handshake authentication process between the AP and the STA will be described with reference to FIG. 3, in which a flowchart diagram illustrating the handshake authentication process between the AP and the STA in the method for securely accessing the portable hotspot for the intelligent mobile phones according to the present disclosure is shown. All algorithms of the two-handshake authentication process are based on algorithms in the prior art.

Figure 3:
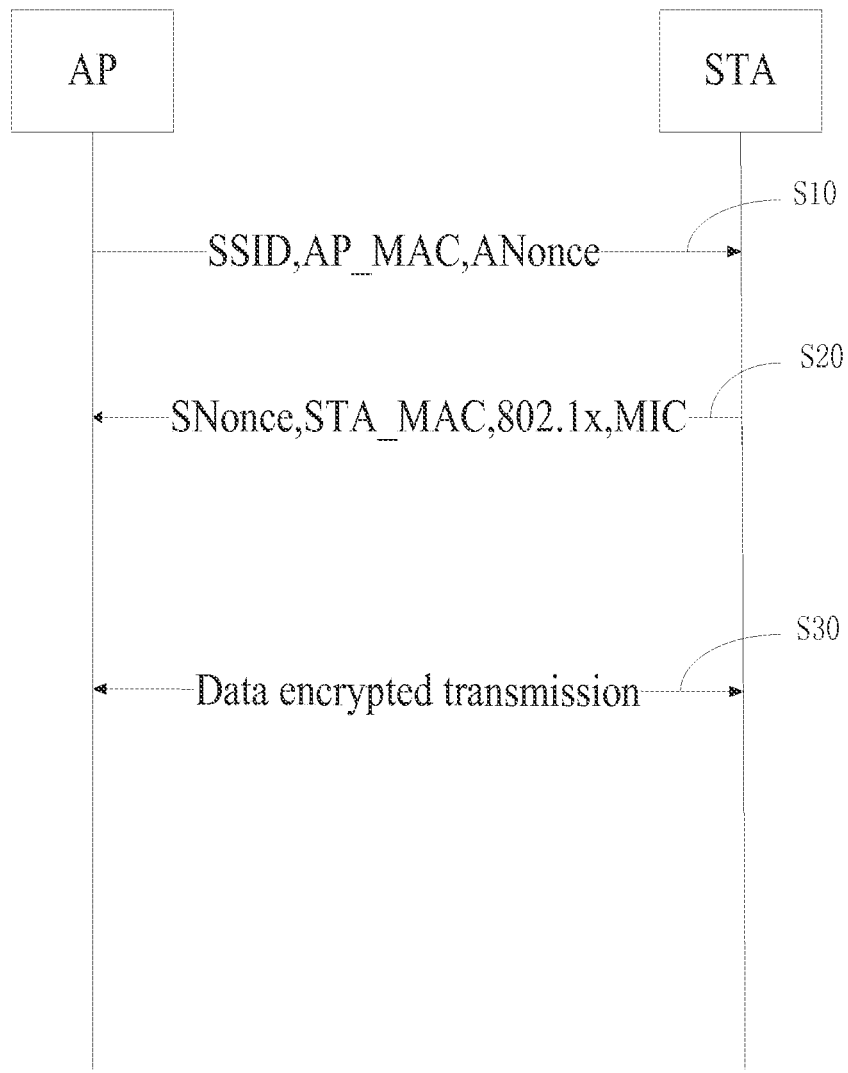
FIG. 3 is a flowchart diagram illustrating a handshake authentication process between an AP and an STA in the method for securely accessing the portable hotspot for the intelligent mobile phones according to the present disclosure.

As shown in FIG. 3, the handshake authentication process between the AP and the STA is performed from the top to the bottom and from the left to the right:

(1) WPA-PSK Initialization (not Shown)

PSK is obtained by the pdkdf2_SHA1 algorithm according to a password, an SSID (Service Set Identifier), a length of the SSID len(SSID) and 4096. In the WPA-PSK, the PSK is equal to the PMK, the password is pre-shared by the AP and the STA, and the operation function of pdkdf2_SHA1 is as follows:

$$PSK=PMK=pdkdf2\_SHA1\ (\\ Password,\\ SSID,\\ Len(SSID),\\ 4096)$$

(2) The First Handshake (Step S10)

The AP broadcasts the SSID, the MAC address AP_MAC of the AP, and the first random number ANonce to the STA; and the STA generates the second random number SNonce, obtains the PSK according to the password, the SSID, the SSID length and 4096 by the pdkdf2_SHA1 algorithm used in the initialization process, obtains a PMK according to the PSK, obtains a PTK according to the PMK, the AP_MAC, the MAC address STA_MAC of the STA, the first random number ANonce and the second random number SNonce by the SHA1_PRF algorithm, forms an MIC KEY according to the front 16 bytes of the PTK, and generates an MIC according to the MIC KEY and the 802.1x data by an HMAC_MD5 algorithm, where the 802.1x data represents one 802.1x data frame; the SHA1_PRF and the HMAC_MD5 algorithms are as follows:

$$PTK=SHA1\_PRF\ (\\ PMK,\\ Len(PMK),\\ \text{"Pairwise key expansion"},\\ Min(AA,SA)\ ||Max(AA,SA)||Min(ANonce,SNonce)||Max(ANonce,SNonce)\\ );$$
$$MIC=HMAC\_MD5(\\ MIC\ KEY,\\ 16,\\ 802.1x data\\ );$$

(3) The Second Handshake (Step S20)

The STA transmits the second random number SNonce, the STA_MAC, the 802.1x and the MIC to the AP; and the AP obtains the PTK according to the PMK, the AP_MAC, the STA_MAC, the first random number ANonce and the second random number SNonce, forms the MIC KEY according to the front 16 bytes of the PTK, and then calculates the MIC' according to the MIC KEY and the 802.1x data.

Through the two handshakes, the security authentication process between the AP and the STA is completed. After the security authentication is completed, step S30 is executed between the AP and the STA to transmit data through WPA encryption for purpose of long-distance data transmission.

In the method of the present disclosure, the authentication between the AP and the STA is completed through the NFC technology by putting the AP and the STA close to or in contact with each other, and then a normal data encrypted transmission process is performed. In this way, the authentication between the AP and the STA becomes more secure and reliable, and the data transmission also becomes more secure, thus solving the problem that handshake packets are likely to be stolen in the WPA authentication process. Therefore, both the security of the WPA protocol and the communication security of mobile terminals can be enhanced.

Figure 4:
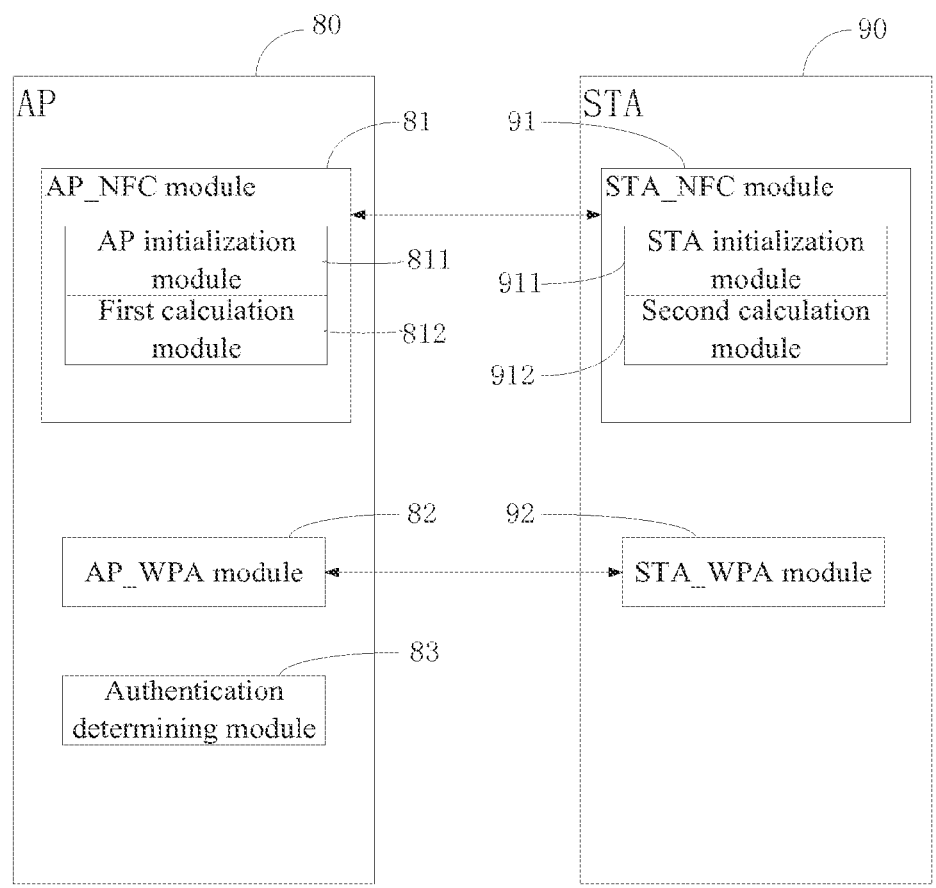
FIG. 4 is a schematic block diagram illustrating a system for securely accessing a portable hotspot for intelligent mobile phones according to the present disclosure.

The present disclosure further provides a system for securely accessing a portable hotspot for intelligent mobile phones. As shown in FIG. 4, the system comprises an AP 80 and an STA 90. Specifically, the AP 80 comprises an AP_NFC module 80 and an AP_WPA module 82.

The STA 90 comprises an STA_NFC module 91 and an STA_WPA module 92.

The AP 80 employs the AP_NFC module 81 to perform a WPA security authentication with the STA_NFC module 91 of the STA 90, and employs the AP_WPA module 82 to perform data encrypted transmission with the STA_WPA module 92.

Specifically, the AP_NFC module 81 comprises an AP initialization module 811 and a first calculation module 812; the STA_NFC module 91 comprises an STA initialization module 911 and a second calculation module 912; the AP initialization module 811 calculates a PSK and a PMK according to a password, an SSID, an SSID length and 4096, and generates a first random number; the STA initialization module 911 calculates a PSK and a PMK according to the password, the SSID, the SSID length and 4096, and generates a second random number; the first calculation module 812 obtains a PTK according to the PMK, an AP_MAC, an STA_MAC, the first random number and the second random number, forms an MIC_KEY according to the first 16 bytes of the PTK, and then calculates an MIC' according to the MIC KEY and the 802.1x data; and the second calculation module 912 obtains a PTK according to the PMK, the AP_MAC, the STA_MAC, the first random number and the second random number, forms an MIC KEY according to the first 16 bytes of the PTK, and then calculates an MIC according to the MIC KEY and the 802.1x data.

The AP 80 further comprises an authentication determining module 83, which is configured to determine whether the MIC' and the MIC calculated by the first calculation module 812 and the second calculation module 912 respectively are equal to each other.

It shall be understood that, what described above are only preferred embodiments of the present disclosure and are not intended to limit the technical solutions of the present disclosure. For those of ordinary skill in the art, additions, deletions, substitutions, variations or improvements may be made to the above descriptions within the spirit and the principle of the present disclosure, and all of them shall fall within the scope defined by the appended claims of the present disclosure.

What is claimed is:

1. A method for securely accessing a portable hotspot for intelligent mobile phones, which comprises an intelligent mobile phone used as an access point (AP) and another intelligent mobile phone used as a station (STA), the method comprising following steps of:
   A. disposing near field communication (NFC) modules in the AP and the STA respectively;
   B. enabling the AP and the STA to perform Wi-Fi Protected Access (WPA) security authentication in an NFC manner, wherein the step B specifically comprises following steps of interacting in the NFC manner:
   B1. obtaining a pre-shared key (PSK) and a pairwise master key (PMK) by the AP according to a password, a service set identifier (SSID), an SSID length and 4096;
   B2. broadcasting the SSID, a network equipment hardware address of the AP, and a first random number by the AP to the STA; and generating a second random number as well as the PSK and the PMK, obtaining a pairwise transient key (PTK) according to the PMK, the network equipment hardware address of the AP, a network equipment hardware address of the STA, the first random number and the second random number, forming a message integrity check keyword (MIC KEY) according to front 16 bytes of the PTK, and generating an MIC according to the MIC KEY and the 802.1x protocol data by the STA;
   B3. transmitting the second random number, the network equipment hardware address of the STA, the 802.1x protocol data and the MIC by the STA to the AP; and obtaining the PTK according to the PMK, the network equipment hardware address of the AP, the network equipment hardware address of the STA, the first random number and the second random number, forming the MIC KEY according to the front 16 bytes of the FIXTK, and then calculating an MIC' according to the MIC KEY and the 802.1x protocol data by the AP, wherein if MIC=MIC', then the authentication is successful, and otherwise, the authentication fails;
   C. disposing a first data transmission module and a second data transmission module in the AP and the STA respectively so that data encrypted transmission is performed between the AP and the STA via the first data transmission module and the second data transmission module.

2. The method of claim 1, wherein the WPA security authentication is a WPA-PSK security authentication.

3. The method of claim 1, wherein the step B2 specifically comprises: obtaining the PSK according to the password, the SSID, the SSID length and 4096 and obtaining the PMK according to the PSK by the STA.

4. A method for securely accessing a portable hotspot for intelligent mobile phones, which comprises an intelligent mobile phone used as an access point (AP) and another intelligent mobile phone used as a station (STA), the method comprising following steps of:
   A. disposing NFC modules in the AP and the STA respectively;
   B. enabling the AP and the STA to perform WPA security authentication in an NFC manner, wherein the step B specifically comprises following steps of interacting in the NFC manner:
   B1. obtaining a PSK and a PMK by the AP according to a password, an SSID, an SSID length and 4096;
   B2. broadcasting the SSID, a network equipment hardware address of the AP, and a first random number by the AP to the STA; and generating a second random number as well as the PSK and the PMK, obtaining a FIX according to the PMK, the network equipment hardware address of the AP, a network equipment hardware address of the STA, the first random number and the second random number, forming an MIC KEY according to front 16 bytes of the PTK, and generating an MIC according to the MIC KEY and the 802.1x protocol data by the STA;
   B3. transmitting the second random number, the network equipment hardware address of the STA, the 802.1x protocol data and the MIC by the STA to the AP; and obtaining the PTK according to the PMK, the network equipment hardware address of the AP, the network equipment hardware address of the STA, the first random number and the second random number, forming the MIC KEY according to the front 16 bytes of the PTK, and then calculating an MIC' according to the MIC KEY and the 802.1x protocol data by the AP, wherein if MIC=MIC', then the authentication is successful, and otherwise, the authentication fails.

5. The method of claim 4, further comprising following step of:
   C. disposing a first data transmission module and a second data transmission module in the AP and the STA respectively so that data encrypted transmission is performed between the AP and the STA via the first data transmission module and the second data transmission module.

6. The method of claim 4, wherein the WPA security authentication is a WPA-PSK security authentication.

7. The method of claim 4, wherein the step B2 specifically comprises: obtaining the PSK according to the password, the SSID, the SSID length and 4096 and obtaining the PMK according to the PSK by the STA.

8. A system for securely accessing a portable hotspot for intelligent mobile phones, comprising an intelligent mobile phone used as an AP and another intelligent mobile phone used as an STA, wherein:
   the AP comprises an AP NFC module and a first data transmission module;
   the STA comprises an STA NFC module and a second data transmission module; and
   the AP employs the AP NFC module to perform a WPA security authentication with the STA NFC module of the STA, and employs the first data transmission module to perform data encrypted transmission with the second data transmission module;
   wherein the AP NFC module comprises an AP initialization module and a first calculation module; the STA NFC module comprises an STA initialization module and a second calculation module; the AP initialization module calculates a PSK and a PMK according to a password, an SSID, an SSID length and 4096, and generates a first random number, the STA initialization module calculates the PSK and the PMK according to the password, the SSID, the SSID length and 4096, and generates a second random number, the first calculation module obtains a PTK according to the PMK, a network equipment hardware address of the AP, a network equipment hardware address of the STA, the first random number and the second random number, forms an MIC KEY according to front 16 bytes of the PTK, and then calculates an MIC' according to the MIC KEY and the 802.1x protocol data; and the second calculation module obtains the PTK according to the PMK, the network equipment hardware address of the AP, the network equipment hardware address of the STA, the first random number and the second random number, forms the MIC KEY according to the front 16 bytes of the PTK, and then calculates an MIC according to the MIC KEY and the 802.1x protocol data; and the AP further comprises an authentication determining module, which is configured to determine whether the MIC' and the MIC calculated by the first calculation module and the second calculation module respectively are equal to each other.

* * * * *